US008260549B2

(12) United States Patent
Poppen

(10) Patent No.: US 8,260,549 B2
(45) Date of Patent: Sep. 4, 2012

(54) TRANSMISSION OF ROUTES BETWEEN CLIENT AND SERVER USING ROUTE IDS

(75) Inventor: Richard F. Poppen, San Jose, CA (US)

(73) Assignee: deCarta Inc., San Jose, CA (US)

( * ) Notice: Subject to any disclaimer, the term of this patent is extended or adjusted under 35 U.S.C. 154(b) by 477 days.

(21) Appl. No.: 12/416,920

(22) Filed: Apr. 1, 2009

(65) Prior Publication Data

US 2009/0248291 A1 Oct. 1, 2009

Related U.S. Application Data

(60) Provisional application No. 61/041,499, filed on Apr. 1, 2008.

(51) Int. Cl.
*G01C 21/00* (2006.01)
(52) U.S. Cl. ........................................................ 701/421
(58) Field of Classification Search .................... 701/213
See application file for complete search history.

(56) References Cited

U.S. PATENT DOCUMENTS

| | | | | |
|---|---|---|---|---|
| 6,725,155 | B1 | 4/2004 | Takahashi et al. | |
| 2003/0130789 | A1 | 7/2003 | McDonough | |
| 2004/0167714 | A1 * | 8/2004 | Macphail | 701/213 |

FOREIGN PATENT DOCUMENTS

| | | | |
|---|---|---|---|
| JP | 2001-041757 | A | 2/2001 |
| JP | 2001-066146 | A | 3/2001 |
| KR | 10-2003-0088426 | A | 11/2003 |
| KR | 10-2004-0004611 | A | 1/2004 |

OTHER PUBLICATIONS

Dijkstra, E.W., "A Note on Two Problems in Connexion with Graphs," Numerische Mathematik, 1959, pp. 269-271, vol. 1.
PCT International Search Report and Written Opinion, PCT/US2009/002062, Nov. 24, 2009, 10 pages.
"XM Navtraffic® Overview," XM Satellite Radio, 2001-2008, 2 pages.

* cited by examiner

*Primary Examiner* — Valerie Lubin
(74) *Attorney, Agent, or Firm* — Fenwick & West LLP

(57) ABSTRACT

Dehydration of routes enables transmitting a description of a route requiring much less space than full specification of the route. A series of "breadcrumbs" and hints are used for dehydration. A breadcrumb includes coordinates of a point, a heading at which the route enters the breadcrumb, and a heading at which the route leaves the breadcrumb. A dehydration module places a breadcrumb at the location marking the beginning of the route, and having a leaving heading identifying the link in the original route. The node at the end of each link in the original route is examined. If the link leaving the node is the most parallel link to the link entering the node, nothing is added to the dehydrated route. If not, a breadcrumb is added to the dehydrated route, specifying the coordinates of the point, the entering heading of the breadcrumb and the leaving heading of the breadcrumb.

4 Claims, 3 Drawing Sheets

TRANSMISSION OF ROUTES BETWEEN CLIENT AND SERVER USING ROUTE IDS

CROSS-REFERENCE TO RELATED APPLICATIONS

This application claims the benefit of U.S. Provisional Application 61/041,499, filed on Apr. 1, 2008, incorporated by reference herein in its entirety.

BACKGROUND

1. Field of the Invention

The present invention relates generally to providing routing functions for navigation systems. In particular, the present invention is directed to more efficient specification of navigation routes.

2. Description of the Related Art

Navigation systems for drivers and pedestrians are becoming increasingly popular in the market. Until recently, most navigation systems were self-contained devices: routes were calculated and points of interest were searched for by means of calculations taking place entirely on the device. A few navigation systems, with less memory and slower processors, were primarily server-based: navigation requests were sent to a server, a route was computed and transmitted to the client device, and then the client device merely monitored progress along the route.

Now, with the advent of cheaper, faster processors in client devices and connections between clients and servers that offer greater bandwidth and more constant connectivity, a new model of navigation is becoming available. In this model, which can be called "connected navigation", the client device can do most of the work of the navigation system, but in addition, certain other functions can be delegated to a server. This model is most advantageous when the functions delegated to the server are those that require either more computational power than is available on the client device or volumes of data too great to transmit to the client efficiently.

One example of such a function is routing that takes current and predicted traffic into account. Some modern automatic traffic information feeds provide current traffic information for all major roads in a metropolitan area, as well as predicted traffic information for every major road for every 15-minute interval of time for the next week. This is a very large amount of information, of which only a very small fraction is actually used to compute any given route. It is therefore very inefficient to transmit all the data to every client device in the area.

SUMMARY

The present invention enables a technique for transmitting a description of a route from a sender to a recipient that requires much less space than a full list of link IDs, yet requires much less computation time to recover the full route description. To abbreviate, or "dehydrate" a route, a series of "breadcrumbs" are used, and in some embodiments accompanied by "hints" to resolve potential errors. A breadcrumb includes coordinates of a point, a heading at which the route enters the breadcrumb, and a heading at which the route leaves the breadcrumb. A first and last breadcrumb mark the beginning and end of the route, and are special cases in that the first breadcrumb does not include an entering heading, and the last breadcrumb does not include an exiting heading. To dehydrate the route, a dehydration module places a breadcrumb at the location marking the beginning of the route, and having a leaving heading identifying the link in the original route. The node at the end of each link in the original route is examined. If the link leaving the node is the most parallel link to the link entering the node, nothing is added to the dehydrated route. If the link leaving the node is not the most parallel to the link entering the node, then a breadcrumb is added to the dehydrated route, specifying the coordinates of the point, the entering heading of the breadcrumb and the leaving heading of the breadcrumb. At the end of the route, an ending breadcrumb is placed.

To "rehydrate" the route, a rehydration module marks the beginning of the route at the point identified by the starting breadcrumb. The link closest to the leaving heading of the starting breadcrumb is selected as a link in the rehydrated route. If no breadcrumb exists identifying the node at the end of that link, then the link leaving that node most parallel to the link entering the node is added to the rehydrated route. This is repeated for subsequent nodes and links. When a node is encountered for which a breadcrumb exists, the link leaving the node most closely parallel to the heading specified by the breadcrumb is added to the dehydrated route. An ending breadcrumb identifies the point at the end of the rehydrated route.

To prevent errors in the case where the hydrating and dehydrating modules are not using exactly the same maps, or perform calculations slightly differently, hints are supplied with or inside the breadcrumbs. Hints in some embodiments specify bounding areas within which some or all of the original route remains. If a route is rehydrated to go beyond a bounding area, then an error has occurred and can be reported.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Detailed Description of the Preferred Embodiments

Figure 1:
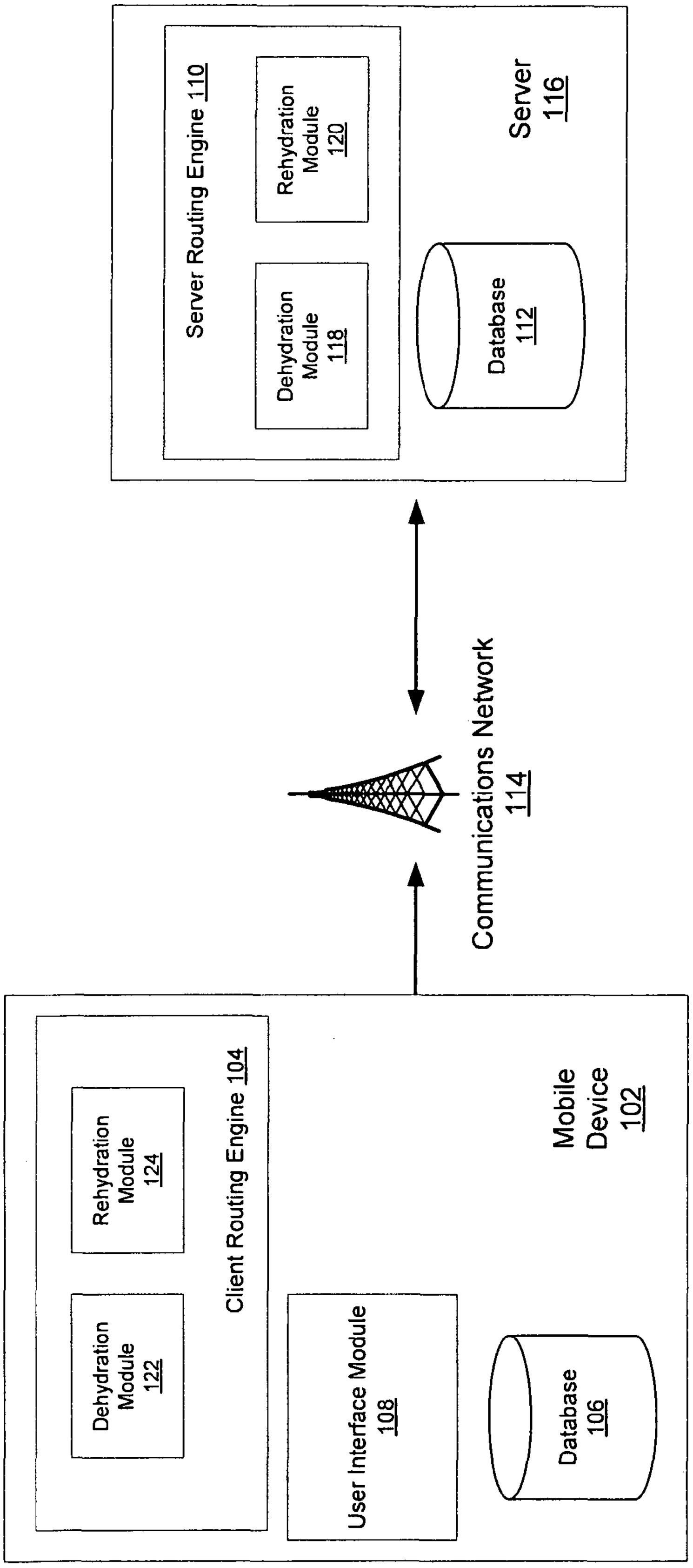
FIG. 1 is a diagram of a mobile device 102 in communication with a server 116 in accordance with an embodiment of the present invention.

FIG. 1 is a diagram of a system 100, in which a mobile device 102 is in communication with a server 116 in accordance with an embodiment of the present invention. Mobile device 102 includes a client routing engine 104, database 106 and user interface (UI) module 108. Server 116 includes a server routing engine 110 and database 112. Client routing engine 104 and server routing engine 110 each include a dehydration module 122, 118, respectively, and a rehydration module 124, 120, respectively. Both client routing engine 104 and server routing engine 110 additionally include features for providing guidance functions; those not described here are not germane to this description. Mobile device 102 and server 116 are in communication with one another via a communications network 114, which may include a cellular, Wi-MAX, WAN or any other suitable network. Mobile device 102 and server 116 each include additional hardware and software for performing additional functions that are either known to those skilled in the art or not germane to this description, and which are therefore not described here. In various embodiments, more or fewer modules may be included in the mobile device and/or server. Furthermore, we refer generally to system 100 to describe the collection of components performing various steps throughout this description. In practice, various elements of system 100 are systems in and of themselves; for example, mobile device 102 in one embodiment is a self-contained system sold separately from server 116, which itself may be made available in whole or in part and separately from the other identified components.

To take the most advantage of connected navigation opportunities such as those described here, it is useful to be able to exchange route information between mobile device 102 and server 116 as efficiently as possible. System 100 provides a way to do just that.

In some cases, the client device may want to transmit a route to the server. For example, the client device may want to search for points of interest (POIs) along a route. Because POI information changes very frequently, especially enhanced POI information such as gasoline prices, it may not be reasonable to send updated POI information continually to all client devices. Instead, the client device may send to the server the route along which searching is to take place, so that the server can identify relevant POIs for the client. Another application may involve the mobile device and server exchanging information about real-time traffic conditions along proposed routes of travel.

For uses such as the above, a description of a route has to be transferred from a sender to a recipient, each of which may be either a client device or a server, depending on the context. One way to describe a route is to transmit a list of every part of the route. For example, in many route computation systems, every possible road link has a link ID, and a route description can be transmitted by sending the list of link IDs for the entire route. For long routes, this can be quite a long list. Another way to describe a route is to transmit a description of a route by transmitting the origin and destination, and enough intermediate waypoints so that the recipient can recompute the route. This requires a much shorter transmission, but much more computation on the part of the recipient to reconstruct the route.

For route computation purposes, navigation systems usually represent the road network in a digital map as a collection of nodes and links, as we do for purposes of this description. A node is a point, such as a road intersection or fork, at which a decision between alternative routes can be made. A link is a possible path from one node to another. The digital map—which may be located in client database 106, server database 112, or both—stores the coordinates (latitude and longitude) of each node, as well as a representation of the geometry of the link, typically as the coordinates (latitudes and longitudes) of a series of points (called shape points) between the starting and ending nodes, chosen so that the sequence of line segments from the starting node through the successive shape points to the ending node follows the shape of the actual road it represents to a desired level of accuracy. The starting and ending points of a route may be nodes, or may be intermediate points along links. In the latter case, they may be shape points of the links, or may be between shape points.

System 100 enables use of an abbreviated description of a route, which we refer to interchangeably as a "route ID" or a "dehydrated route", to communicate between mobile device 102 and server 116. The abbreviated description includes representations of critical decision points on the route, which we refer to here as "breadcrumbs", and hints as to the route between breadcrumbs. Each breadcrumb includes a representation of the coordinates of the point and a representation of the heading of the route as it enters and leaves the breadcrumb. In one embodiment the breadcrumb representing the starting point does not have a representation of an entering heading, and the breadcrumb representing the ending point does not have a representation of a leaving heading. The breadcrumbs are chosen so that the route from each breadcrumb to the next can be reconstructed by leaving the first breadcrumb with the specified heading, and at each node taking the link that goes most nearly in the same direction as the incoming link, until the next breadcrumb is reached.

Figure 2:
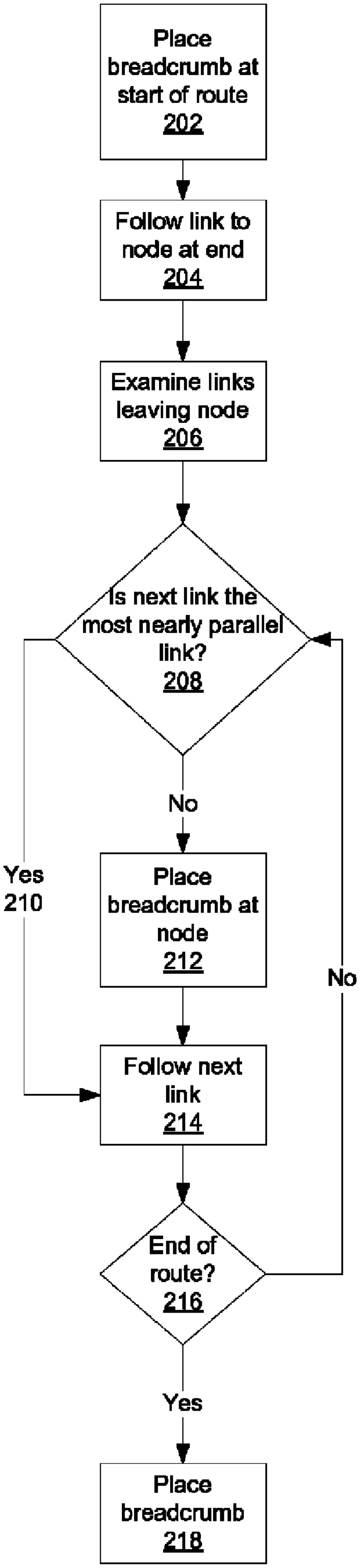
FIG. 2 is a flowchart illustrating a method for abbreviating a route description in accordance with an embodiment of the present invention.

Placement of breadcrumbs is performed in one embodiment by the dehydration module that is describing the route. On some occasions, it will be client dehydration module 122 describing the route; at other times it will be server dehydration module 118 describing the route. In one embodiment, and referring to FIG. 2, the placement of breadcrumbs is determined as follows: A breadcrumb is placed 202 at the starting point of the route, which may or may not be a node. The sequence of links in the route is then inspected, one by one in sequence. The first link of the route is followed 204 to the node at the end. The links leaving that node are inspected 206. If 208 the next link of the route is the link that leaves the node with a heading most nearly equal to the entering link in the route (the "most nearly parallel next link"), no breadcrumb is placed at the node 210. However, if 208 the next link of the route is not the most nearly parallel next link, a breadcrumb is placed 212 at the node. In either case, the next link of the route is followed 214 to its end, which is either the next node, or the end of the route. If 216 the link ends at the end of the route, a breadcrumb is placed 218 at the end. If 216 the link ends at another node, the process returns to step 208 and the next link is checked to see whether it is the most nearly parallel link. This process repeats until the end of the route is reached.

A change in the data stored at either database 106 or database 112 can make the reconstituting of the full route, which we also refer to as "rehydration", fail, because the next breadcrumb may never be found. (Similarly, we refer to the abbreviating of the route as "dehydration".)

Accordingly, to make this kind of failure unlikely, in some embodiments of the invention extra information called "hints" are included along with the dehydrated route used to describe the path of the route between consecutive breadcrumbs, and describe areas in which that path is contained. In some embodiments, that containing area is a bounding rectangle containing that path. The description of that bounding rectangle is encoded in one embodiment by using the number of a key containing or describing that rectangle in a predetermined spatial keying system, such as that described in U.S. Pat. No. 5,963,956, incorporated by reference herein in its entirety. In some embodiments, a hint contains a description of an ellipse containing that path between consecutive breadcrumbs. The ellipse is chosen so that its foci are the two breadcrumbs, so that only one more parameter is required to describe the ellipse. In some such embodiments, that additional parameter is the eccentricity of the ellipse; in others, that additional parameter is the sum of the distances from any point on the ellipse to the two foci; alternatively, that additional parameter is the ratio of that sum of distances to the direct or Euclidean or great-circle distance between the two foci.

In various embodiments, a hint includes an indication of the total length of the path between the two breadcrumbs. In one such embodiment, that length is represented as the ratio of the length of the path along the route to the direct or Euclidean or great-circle distance between the two breadcrumbs.

In one embodiment, the representation of the containing area or bounding distance described in a hint is enlarged slightly from the actual containing area, in order to make reconstruction of the original route more reliable.

From the breadcrumbs and the hints, an encoded description of the route is created. The description of each breadcrumb contains a representation of the coordinates of the breadcrumb as well as the headings of the links entering and exiting the breadcrumb. As noted, the first breadcrumb does not have an incoming heading, and the last breadcrumb does not have an exiting heading. In some embodiments, in order to minimize the amount of data to be transmitted, the accuracy of the representation of the coordinates and/or the headings is different for different breadcrumbs, to allow for the accuracy necessary to distinguish a breadcrumb from another nearby node and/or to distinguish the actual entering or exiting link from another nearby link, while allowing less accuracy where such distinctions are unnecessary. In such embodiments, the encoding of the breadcrumb contains a representation of their accuracy. In one embodiment, this is represented by a small number of bits encoding the number of bits to be used in each coordinate, which is followed by the bits representing the coordinates themselves. Similarly, each hint contains a representation of the bounding area or areas or of the length of the path between the breadcrumbs.

The description of the dehydrated route, which may be called a "route identifier" or "route ID" for short, is transmitted between mobile device 102 and server 116 via communications network 114.

Figure 3:
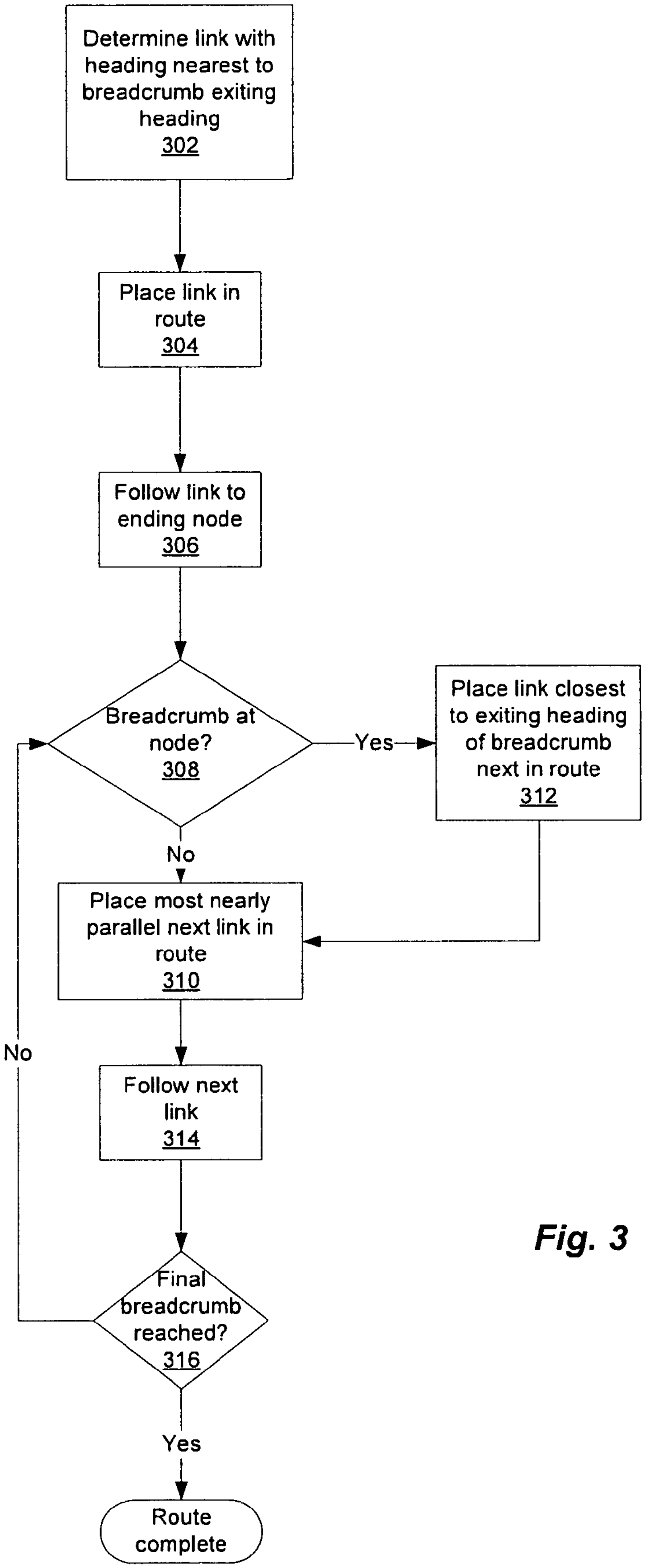
FIG. 3 is a flowchart illustrating a method for restoring an original route from an abbreviated route in accordance with an embodiment of the present invention.

The rehydration module located at the recipient then uses the route ID to reconstruct the original route. In one embodiment, and referring to FIG. 3, the reconstruction is performed as follows: The link nearest to the starting breadcrumb, with the heading nearest to the breadcrumb's exiting heading, is determined 302 and placed 304 in the reconstructed route. The link is followed 306 to its ending node. If 308 the node is not at the next breadcrumb within the accuracy of the breadcrumb, or if the ending heading of the link is not equal to the entering heading of the next breadcrumb within the accuracy of the breadcrumb, the most nearly parallel next link is selected and placed 310 in the reconstructed route. If 308 the node is at the next breadcrumb and the ending heading of the link is equal to the entering heading of the next breadcrumb, both to within the accuracy of the breadcrumb, then the link exiting the node with the heading most nearly matching the exiting heading of the breadcrumb is selected and placed 312 in the reconstructed route. In either case, the selected link is followed 314 to its end node, and the process is repeated until a link is selected which ends at or contains the final breadcrumb 316, to within the accuracy of the breadcrumb, and which reaches that point at the entering heading of the breadcrumb, to within the accuracy of the breadcrumb. The reconstruction of the route is then complete.

In some embodiments, in the above process, the hints are used to check for deviations that cannot possibly be part of the original path. In reconstructing the route from one breadcrumb to the next, the path of a selected link is compared to the bounding area or areas described in the hints for that section of the route. If the path of the link goes outside the area or areas described in the hints, the rehydration module determines that an error has occurred, and the process is terminated with an error indication.

If the maps stored in mobile device database 106 and server database 112 differ, it is possible that a link selected as the nearest to a point is not the correct choice, and that a different link is the correct choice. In some embodiments, a backtrack approach is used to allow more robust reconstruction of routes with fewer failures. (Backtracking as a method of search in general is well known in the art.) This approach enables reconstruction of the route between one breadcrumb and the next to succeed by proceeding in the following way: At each step of reconstruction, more than one possible next link may be identified. For example, if other links are close in heading to the most nearly parallel next link, they may also be considered possible next links. If the reconstruction of a route fails, for example, because the next link goes outside the bounding area(s), the rehydration module goes back to the most recent node at which there is an untried possible next link, uses that link instead of the choice previously made at that node, and proceeds forward. If the reconstruction fails again, the rehydration module goes back again to the most recent node at which there is an untried possible next link, and so on, until either the reconstruction reaches the next breadcrumb or until the reconstruction fails because there are no more untried possible next links since the previous breadcrumb.

The embodiments described above use a single criterion in deciding which is the next link to be selected, namely, the most nearly straight next link. In fact other criteria can be used for this selection in various embodiments. In some embodiments, the link chosen to be the next link is chosen on the basis of multiple criteria including heading. For example, a scoring system can be used, in which possible next links are assigned scores based on how nearly the headings match, how nearly the names of the roads match, and whether the roads are of the same type, for example, ramp vs. non-ramp, and the possible next link with the best score, rather than merely the most nearly straight next link, is chosen. This takes advantage of the observation that, for example, optimal routes tend to continue in the direction they were already traveling and on the street they were already on.

One of ordinary skill in the art will understand that a number of variations on methods described above can be employed. In particular:

The order of steps is not significant in the method described. The description above is phrased as though all the breadcrumbs are placed, and then the route ID is emitted. The solution works equally well if the placing of breadcrumbs and the emitting of steps in the route ID are interspersed with each other.

The order of breadcrumbs and hints in the emitted route ID is not significant. A list of breadcrumbs can be emitted before a list of all hints, or hints can be interspersed between the breadcrumbs.

The choice of where to place breadcrumbs is described in terms of traversing the route in the forward direction, from origin to destination. The route can equally well be traversed in the reverse direction, from destination to origin.

The selection of breadcrumbs is described in terms of finding possible next links that most closely correspond, in some way (heading, name, and/or road type) to a given link. Breadcrumbs could equally well be chosen by comparing possible previous links, or by selecting bidirectional criteria. For example, a breadcrumb can be placed wherever a node's exiting link is not the most nearly straight next link or the node's entering link is not the most nearly straight previous link.

In one embodiment, dehydrated routes are provided only in one direction, either from mobile device 102 to server 116, or from server 116 to mobile device 102. In such a case, the sender of the dehydrated route need not include a rehydration module, and the recipient of the dehydrated route need not include a dehydration module.

The present invention enables a form of routing that can be called "server-based traffic-advised routing". In this use, a route computation is performed on a mobile client device 102 that has no traffic information or limited traffic information. A description of the route (which may be a dehydrated route ID as described above, or a route described in a conventional manner) is then transmitted to server 116, which has a large amount of traffic information, for example, current and/or predicted and/or historic traffic conditions on many roads in a geographic area. The server 116 then computes the expected driving time for the route as transmitted by the client 102, and re-computes one or more alternative routes from the origin of the route transmitted by the client to the destination of that route. If that route is (or those routes are) different from the route transmitted by the client, the alternative route is (or the alternative routes are) transmitted back to the client device 102 (again by transmitting one or more route IDs). In one embodiment, if the alternative route to be transmitted back to mobile client device 102 either begins and/or ends with a series of routing steps common to the original route, server 116 transmits only the changed portion of the route, along with a sequence number or other indication of which segments of the original route ID needs to be changed.

In another embodiment, an even more compact transmission to the client device is made by transmitting an image (such as a GIF, JPEG, or PNG image) of the alternative route(s) to the client device, optionally in addition to other descriptive information such as estimated driving time, and transmitting a route ID only if one of the alternative route(s) is selected by the user of the client device.

Server-based traffic advised routing is further described in U.S. patent application Ser. No. 12/416,812, filed on Apr. 1, 2009, and incorporated by reference herein in its entirety.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components. For example, the particular functions of the dehydration module 122 and rehydration module 124 may be provided in many or one module.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A method for creating an abbreviated description of an original navigation route, the navigation route having an originating point and a destination point, and represented by a plurality of links, each joining a plurality of nodes, the method comprising:

for each node reached by an incoming link on the original route and having multiple exiting links, each exiting link having a heading:

determining, by at least one computer, a heading of the incoming link;

determining, by the computer, the heading of the exiting link; along the route exiting the node;

responsive to a determination by the computer that the exiting link along the route is not the most parallel exiting link to the incoming link, placing, by the computer, a breadcrumb in the abbreviated description of the route, the breadcrumb including coordinates of a point represented by the node, a representation of a heading of the incoming link, and a representation of a heading of the exiting link along the original route; and placing, by the computer, a breadcrumb at the end of the abbreviated description of the original route, the breadcrumb including coordinates of a node representing a point at the end of the route and a representation of a heading of an incoming link to the node.

2. The method of claim 1 further comprising placing a breadcrumb at the beginning of the abbreviated description of the original route, the breadcrumb having coordinates of the location of the originating point and a heading of the route as it leaves the breadcrumb.

3. A method for determining an original navigation route from an abbreviated route description, the abbreviated description including a plurality of breadcrumbs, each breadcrumb including coordinates of a location along the route and at least one of an entering heading and a leaving heading, the method comprising:

determining, by at least one computer, an origination point for the original route as a point identified by coordinates of a breadcrumb in the abbreviated route and notated as representing the origination point;

selecting as a link in the original route a link most closely parallel to a leaving heading specified by the breadcrumb representing the origination point;

for each node at the end of a link selected as a link in the original route:

inserting, by the computer, a node at the end of the selected link into the original route;

responsive to no breadcrumb in the abbreviated route having coordinates identifying the node, selecting, by the computer, as the next link in the original route a link leaving the node most parallel to the link entering the node;

responsive to one of the breadcrumbs in the abbreviated route having coordinates identifying the node, selecting, by the computer, as the next link in the original route a link leaving the node most parallel to the leaving heading of the matching breadcrumb; and displaying the original route in a user interface of a navigation device.

4. A computer program product for creating an abbreviated description of an original navigation route, the navigation route having an originating point and a destination point, and represented by a plurality of links, each joining a plurality of nodes, the computer program product stored on a non-transitory computer readable medium and including instructions configured to cause a computer to carry out the steps of:

for each node reached by an incomining link on the original route and having multiple exiting links, each exiting link having a heading:

determining, by at least one computer, a heading of the incoming link;

determining, by the computer, the heading of the exiting link along the route exiting the node;

responsive to a determination by the computer that the exiting link along the route is not the most parallel exiting link to the incoming link, placing, by the computer, a breadcrumb in the abbreviated description of the route, the breadcrumb including coordinates of a point prepresented by the node, a representation of a heading of the incoming link, and a representation of a heading of the exiting link along the original route; and placing, by the computer, a breadcrumb at the end of the abbreviated description of the original route, the breadcrumb including coordinates of a node representing a point at the end of the route and a representation of a heading of an incoming link to the node.

* * * * *